(12) United States Patent
Nishizawa

(10) Patent No.: US 7,652,877 B2
(45) Date of Patent: Jan. 26, 2010

(54) ELECTRONIC APPARATUS

(75) Inventor: Masatoshi Nishizawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/073,459

(22) Filed: Mar. 5, 2008

(65) Prior Publication Data

US 2008/0218955 A1     Sep. 11, 2008

Related U.S. Application Data

(63) Continuation of application No. PCT/JP2005/016817, filed on Sep. 13, 2005.

(51) Int. Cl.
*H05K 5/00* (2006.01)
*H05K 7/00* (2006.01)

(52) U.S. Cl. .................. 361/679.27; 361/679.28; 361/679.55

(58) Field of Classification Search .......... 361/679.27, 361/679.28, 679.29, 679.55
See application file for complete search history.

(56) References Cited

U.S. PATENT DOCUMENTS

| | | | |
|---|---|---|---|
| 5,103,376 A | * | 4/1992 | Blonder .............. 361/679.09 |
| 5,494,447 A | * | 2/1996 | Zaidan ................. 439/31 |
| 5,644,469 A | | 7/1997 | Shioya et al. |
| 6,437,978 B1 | | 8/2002 | Ozaki et al. |
| 7,273,089 B2 | * | 9/2007 | Hata et al. ............ 165/104.33 |
| 2004/0042173 A1 | | 3/2004 | Tomioka |

FOREIGN PATENT DOCUMENTS

| | | |
|---|---|---|
| JP | 4-284519 | 10/1992 |
| JP | 4-333958 | 11/1992 |
| JP | 10-254583 | 9/1998 |
| JP | 2000-227824 | 8/2000 |
| JP | 2004-95890 | 3/2004 |

OTHER PUBLICATIONS

International Search Report PCT/ISA/210) mailed Dec. 13, 2005 in connection with the International Application PCT/JP2005/016817.

* cited by examiner

*Primary Examiner*—Jayprakash N Gandhi
*Assistant Examiner*—Anthony M Haughton
(74) *Attorney, Agent, or Firm*—Fujitsu Patent Center

(57) ABSTRACT

An electronic apparatus includes a first part, a second part, and a rotating holding part configured to rotatably hold the second part to the first part, wherein, in addition to a closed state in which the first part and the second part are placed upon one another and an opened state in which the second part is apart from the first part so that both first and second parts are opened, an intermediate state is provided in which respective opposite faces of the first and second parts are apart by a predetermined space and thereby radiation is available, and a lifting mechanism is provided to cause an end of the second part to be apart from a corresponding end of the first part in the rotating holding part so that the opposite faces of both parts are apart by the predetermined space and thus the intermediate state is created.

6 Claims, 6 Drawing Sheets

ELECTRONIC APPARATUS

CROSS-REFERENCE TO RELATED APPLICATION

This application is a U.S. continuation application filed under 35 USC 111(a) claiming benefit under 35 USC 120 and 365(c) of PCT application JP2005/016817, filed Sep. 13, 2005. The foregoing application is hereby incorporated herein by reference.

BACKGROUND OF THE INVENTION

1. Field of the Invention

The present invention relates to an electronic apparatus, and, in particular, to an electronic apparatus of a clamshell type.

2. Description of the Related Art

As one example of an electronic apparatus of a clamshell type, FIG. 1 shows a so-called notebook type personal computer 10 having two parts, i.e., an LCD part 20 and a body part 30. Then, when the personal computer 10 is used, as shown in FIG. 1, the LCD part 20 is opened from the body part 30, while, when the personal computer 10 is not used, the LCD part 20 is closed to the body part 30. In this configuration, in the closed state, compact portability is provided, adhesion of dust/dirt to an LCD screen 21 provided on the LCD part 20 can be avoided, and also, damage to the LCD screen 21 can be avoided.

Not only such a notebook type personal computer, but also a clamshell type cellular phone, a clamshell type portable game console, a clamshell type portable DVD player or such, belongs to an electronic apparatus of a clamshell type.

In the related art, in the notebook type personal computer 10 as an information equipment of a clamshell type, radiation is achieved by means of, in addition to forced radiation with the use of a fan or such acting as radiating means for radiating from internal units such as a CPU and so forth, upon operation of the personal computer, through a radiation fan discharging hole 33, natural radiation is utilized with the use of a housing surface including a keyboard 31, a palm rest 32, and so forth, together, to seek more efficient radiation.

However, in the case of the notebook type personal computer 10 shown in FIG. 1 as one example, in an operation environment (see FIG. 2) in which the personal computer 10 is used with the LCD part 20 kept closed, the housing surface including the keyboard 31 and the palm rest 32 is covered by the LCD part 20 and thus, is not exposed. Therefore, the above-mentioned natural radiation does not function, and thus, the radiation efficiency may degrade. In order to avoid radiation efficiency degradation, it may be necessary to improve the forced radiation efficiency by providing another fan for example.

Japanese Laid-Open Patent Applications Nos. 2004-95890 and 10-254853 disclose related arts.

SUMMARY OF THE INVENTION

The present invention has been devised in consideration of the above-mentioned problem, and an object of the present invention is to provide a configuration such that, in an electronic apparatus of a clamshell type, a common radiation design can be applied to both an operation environment in which, for example, the above-mentioned LCD part 20 is opened, and another operation environment in which the LCD part 20 is closed.

For example, in a field of such a notebook type personal computer, a required performance upgrades year by year, along therewith a heat generation rate of a processor thereof increases accordingly. Recently, a heat generation rate of a CPU in a potable, thin-type notebook type personal computer is more than 30 W, and, radiation design thereof may become a serious problem. A heat generation rate of not only a CPU, but also other internal components, i.e., a memory controller, a graphic controller, or such, increases along with upgrade of the performance of the notebook type personal computer, and thus, the radiation design thereof should be made also in consideration thereof.

When such a notebook type personal computer, i.e., an electronic apparatus of a clamshell type, is designed, TDP (Thermal Design Power) is determined for each of internal components such as a CPU, a memory controller, a graphic controller and so forth, and the design should be made in consideration of TDP.

If only forced radiation such as that with the use of a fan or such for sufficiently radiating in consideration of TDP is used, a required capacity of a forced radiation device such as a fan or such increases, and thus, miniaturization and reduction in the weight of the apparatus may be obstructed. In order to solve this problem, as mentioned above, natural radiation such as that with the use of the keyboard 31, the palm rest 32 and so forth may be considered in the radiation design.

In such radiation design, restriction may be required such that an operation frequency of a CPU is reduced to reduce heat generation from the CPU for a case where natural radiation may not be relied upon in such an operation environment (see FIG. 2) in which, as mentioned above, the LCD part 20 is closed. In this case, the user's operation of the personal computer may be restricted accordingly.

That is, as an operation environment of the user, for example, in an office, as shown in FIG. 2, an operation environment of desktop style is available in which, an external monitor 50, an external keyboard 60, an external mouse 70 and so forth, are connected to the personal computer 10, and the personal computer 10 itself is used as a processing unit. In particular, when a docking station, a port replicator or such, is applied, such an operation environment is used.

In such an operation environment in which the personal computer 10 is used with the LCD part 20 kept closed, natural radiation with the use of the keyboard 31, the palm rest 32 and so forth, does not function as mentioned above, and thus, such a way to restrict the operation frequency of the CPU or such, mentioned above, may be required to reduce heat generation from the internal components.

In order to eliminate the necessity to restrict the user's operation condition, it is necessary to carry out radiation design such that sufficient radiation can be achieved even in the above-mentioned state in which the LCD part 20 is kept closed.

According to the present invention, in such an electronic apparatus of a clamshell type including a first part and a second part (i.e., in the above-mentioned example, the body part 30 and the LCD part 20, respectively), a rotating holding part is provided to rotatably hold the second part to the first part, and, in addition to a closed state in which the first part and the second part are placed upon one another and an opened state in which the second part is apart from the first part so that the first and second parts are opened from one another, an intermediate state is provided in which respective opposite faces of the first and second parts are apart by a predetermined space and thereby radiation is available therethrough, and a lifting mechanism is provided to cause an end of the second part to be apart from a corresponding end of the first part in the rotating holding part so that the opposite faces of both parts are apart by the predetermined space and thus the intermediate state is provided.

In this configuration, in the rotating holding part connecting the first part with the second part, the lifting mechanism is provided to lift one of the first and the second part from the other so as to create the intermediate state. As a result, it is possible to create the state (i.e., the intermediate state), even which is close to the above-mentioned closed state, in which the respective opposite faces of the first part and the second part are apart from one another.

In this intermediate state, the first part and the second part are apart from one another while they face one another with a short distance. As a result, in this state, the same as in the closed state, adherence of dirt/dust to the opposite faces, damage to the opposite faces, or such, can be avoided.

Further, in the intermediate state, air circulation is available between the opposite faces through the space provided therebetween. Therefore, natural radiation is available from the opposite faces, and thus, natural radiation effect the same as in the opened state can be obtained.

DESCRIPTION OF REFERENCE NUMERALS

10 NOTEBOOK TYPE PERSONAL COMPUTER
20 LCD PART (SECOND PART)
21 LCD (DISPLAY SCREEN)
22 LATCH PART
22a LOOP-SHAPED MEMBER
22b OPENING PART
30 BODY PART (FIRST PART)
31 KEYBOARD (OPERATION PART)
32 PALM REST
33 RADIATION FAN DISCHARGING HOLE
34 LATCH PART
34a ROTATION SHAFT
34b LATCH PART BODY
34c LATCH PIN
35 COIL SPRING
36 AUXILIARY FAN (SUPPLEMENTARY CIRCULATING DEVICE)
37 CABLE SHAPED LIKE A COIL SPARING
38 MOVABLE SHAFT
39 LOCK PIN
40 HINGE PART (ROTATING HOLDING PART)

DESCRIPTION OF THE PREFERRED EMBODIMENTS

Embodiments of the present invention will now be described with reference to figures.

Figure 3:
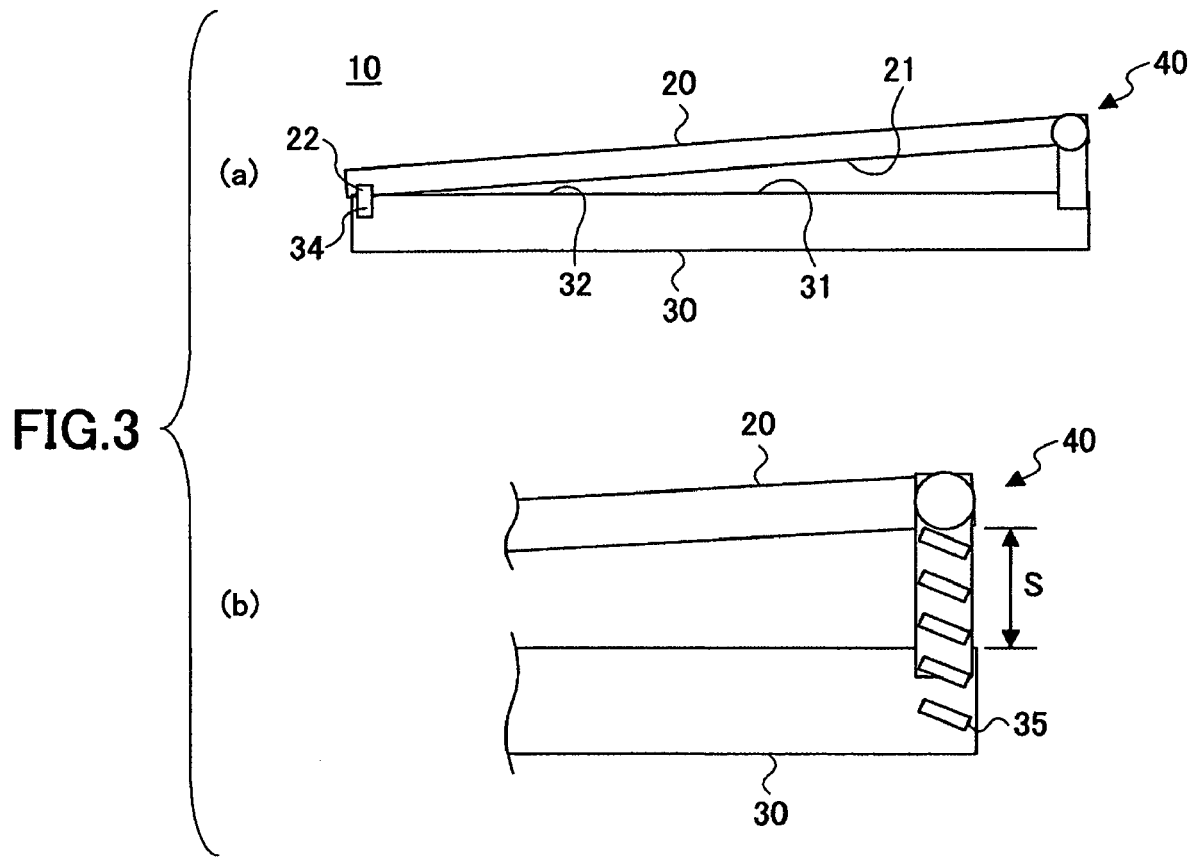
FIG. 3 shows a side view of a personal computer of a clamshell type in a first embodiment of the present invention in an intermediate state (FIG. 3 (a)), and shows a partial magnified view of the same (FIG. 3, (b))

FIG. 3 shows a side view of a notebook type personal computer 10 in a first embodiment of the present invention.

Figure 1:
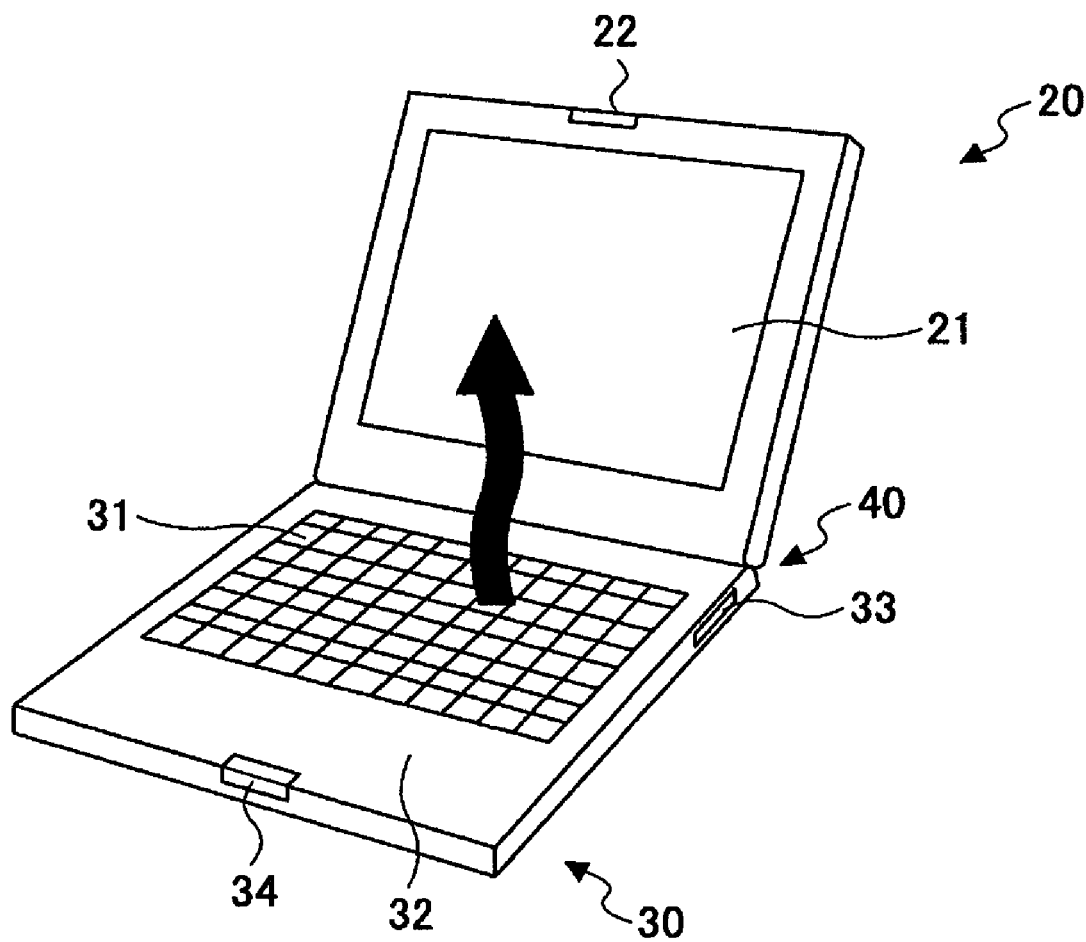
FIG. 1 shows a perspective view of a personal computer of a clamshell type in the related art and also shows a perspective view of a personal computer of a clamshell type in an embodiment of the present invention.
Figure 2:
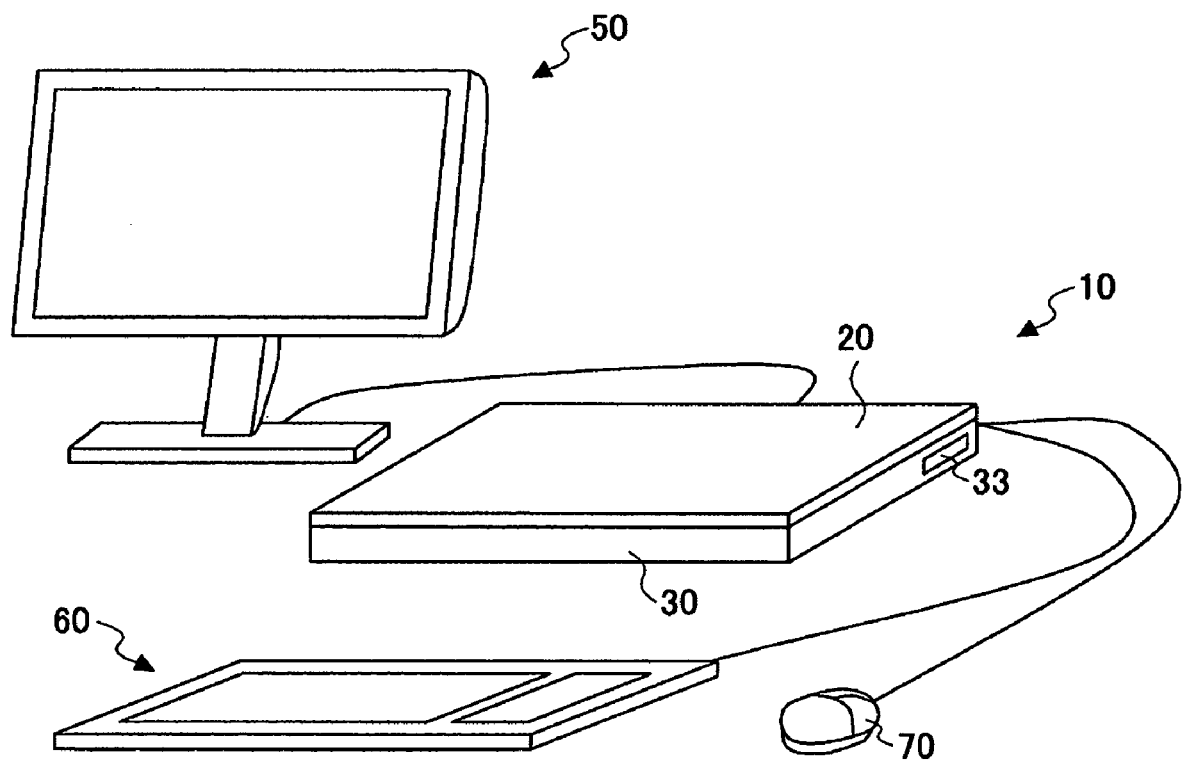
FIG. 2 shows an operation environment of desktop style in which the personal computer shown in FIG. 1 is used as a processing unit in a closed state.

This notebook type personal computer 10 has, in addition of the opened state as shown in FIG. 1 and the closed state as shown in FIG. 2, an intermediate state shown in FIG. 3. Thus, the notebook type personal computer 10 in the first embodiment of the present invention has a total of the three different states.

FIG. 1 shows a perspective view of the notebook type personal computer 10 as an electronic apparatus of a clamshell type in the opened state, and simultaneously, FIG. 1 shows a perspective view of the notebook type personal computer 10 in the first embodiment of the present invention.

That is, the notebook type personal computer 10 in the first embodiment of the present invention has an outline view the same as that of the notebook type personal computer 10 in the related art shown in FIG. 1, in the opened state. Further, in the same way, the notebook type personal computer 10 in the first embodiment of the present invention has an outline view the same as that of the notebook type personal computer 10 in the related art shown in FIG. 2 in the closed state.

Therefore, hereinafter, the notebook type personal computer 10 in the first embodiment of the present invention may be referred simply to as a personal computer 10 or a notebook type personal computer 10, and also, respective components of the personal computer 10 mean those of the personal computer 10 in the first embodiment of the present invention unless otherwise noted.

As shown in FIG. 1, the notebook type personal computer 10 generally has two parts, i.e., a body part 30 as a first part and an LCD part 20 as a second part.

The LCD part 20 has an LCD 21 acting as a display screen. The body part 30 has a keyboard 31 which is an operation part. The LCD part 20 is rotatably supported by the body part 30 by means of a hinge part 40 (acting as a rotating holding part) by means of a well-know hinge function of a hinge included in the hinge part 40.

When using the notebook type personal computer 10, a user as an operator opens the LCD part 20 from the body part 30 by rotating the LCD part 20 on the hinge of the hinge part 40 which acts as a rotation axis, for the opened state shown in FIG. 1, from the closed state shown in FIG. 2.

In the opened state, the user places his or her wrist of the palm on a palm rest 32 which is a part of a housing of the body part 30, and in this state, his or her fingers are used to hit keys of the keyboard 31 so as to input various instructions, data or such, to the personal computer 10.

On the LCD 21, processing results finally obtained from processing according to the user's operation on the keyboard 31 or such are displayed. The user sees them to obtain necessary information from the personal computer 10.

Further, in the inside of the personal computer 10, control devices such as a CPU, a memory controller, a graphic controller, and so forth, are provided (not shown), and generate heat accordingly when they operate. The heat thus generated from the control devices included in the inside of the personal computer 10 should be radiated to the outside of the personal computer 10. for this purpose, the personal computer 10 has a forced radiation fan inside of the body part 30, and also, a radiation fan discharging hole 33 is provided for discharging hot air forcibly discharged by the forced ration fan.

Further, for the purpose of radiating heat generated by the above-mentioned control devices, natural radiation is utilized through a surface of a housing of the personal computer 10 (simply referred to as a housing surface, hereinafter) including the keyboard 31 and the palm rest 32.

Further, as shown in FIG. 2, the personal computer 10 can be used also in an operation environment of desktop style in which the personal computer 10 is used as a processing unit in the closed state. In this case, since the personal computer 10 is in the closed state, the LCD 21 and the keyboard 31 provided on respective opposite faces opposite to one another of the LCD part 20 and the body part 30 cannot be used since the LCD 21 and the keyboard 31 are hidden as inner surfaces placed on one another in the personal computer 10 in the closed state.

Instead thereof, an external monitor 50, an external keyboard 60 and an external mouse 70 are connected to the personal computer 10, and they are used as a display part and an operation part of the personal computer 10, respectively. As a result, the user uses the personal computer 10 itself only as a processing unit.

In this operation environment of desktop style, as mentioned above, the personal computer 10 is used in the closed state as shown in FIG. 2, thus the housing surface including the keyboard 31 and the palm rest 32 provided on the opposite faces of the LCD part 20 and the body part 30 opposite to one another are hidden as internal faces of the LCD part 20 and the body part 30 being placed on one another in the personal computer 10. Therefore, natural radiation with the use of the keyboard 31, the palm rest 32 and so forth, cannot function.

Therefore, in the radiation design of the personal computer 10, as a compensation for the above-mentioned fact that the natural radiation cannot function, measures are required such that another forced radiation means is provided, a capacity of the existing means is increased, or the user's operation is restricted for controlling heat generation such that the operation frequency of the CPU is reduced when the personal computer 10 is used in the operation environment of desktop style, or such, for example.

In order to solve this problem, the intermediate state such as that shown in FIG. 3 is provided in the embodiment of the present invention, instead of the closed state, for the above-mentioned operation environment of desktop style.

That is, in the notebook type personal computer 10 in the first embodiment of the present invention, a lifting mechanism for lifting the LCD part 20 is provided in the hinge part 40 of the LCD part 20. The intermediate state is provided as a result of the LCD part 20 being lifted by the lifting mechanism so that a space is created between the LCD part 20 and the body part 30. Thereby, natural air circulation is available through the thus-created space. As a result, radiation effect the same as that in the opened state shown in FIG. 1 is available, and thus, radiation through the housing surface including the keyboard 31 and the palm rest 32 of the body part 30 is available in the intermediate state the same as in the case where the personal computer 10 is used in the opened state.

It is assumed that terminal design is made in such a condition that a thermal resistance value, in a case where heat generation from the CPU in the state in which the LCD part 20 is opened is 30 W, is approximately 1.5° C./W. In this case, radiation design is made assuming that, the thermal resistance value increases to approximately 1.7° C./W in the state in which the LCD part 20 is closed, while radiation of approximately 3.5 W is made from the housing surface including the keyboard 31 and the palm rest 32.

In the first embodiment of the present invention, as mentioned above, the intermediate state is created in which the space is provided between the LCD part 20 and the body part 30, natural air circulation is thus available through the space, and as a result, radiation from the housing surface including the keyboard 31 and the palm rest 32 is available the same as in the case where the LCD part 20 is opened in the above-mentioned opened state. As a result of the radiation the same as in the opened state in which the LCD part 20 is opened being thus available, the above-mentioned assumption of the radiation of approximately 3.5 W from the housing surface including the keyboard 31 and the palm rest 32 can also be used, as it is, in the intermediate state. That is, in the intermediate state shown in FIG. 3, it is possible to adopt the radiation design the same as that for the opened state of FIG. 1.

Specifically, the space S (see FIG. 3 (b)) of approximately 20 [mm] is provided between the opposite faces of the body part 30 and the LCD part 20 opposite to one another. As a result, natural air circulation is available through the space S so that radiation is accelerated, and thus, it is possible to control the above-mentioned thermal resistance value to be low.

That is, as shown in FIG. 3 (b), a lifting mechanism of a coil spring 35 is mounted to the hinge part 40, a self stretching function of the coil spring 35 with its resilient force lifts the LCD part 20 from the body part 30 together with the hinge of the hinge part 40 approximately 20 mm to rotate the LCD part 20 on the latch parts 22 and 34 acting as a rotation axis (see FIG. 3 (a)). Thereby, the space S is provided between the LCD part 20 and the body part 30.

Further, in this case, a configuration is provided to lock together the latch parts 22 and 34 when the LCD part 20 is thus lifted from the body part 30 as shown in FIG. 3 (a). As a result, as shown in FIG. 3 (a), when the LCD part 20 is thus lifted together with the hinge of the hinge part 40 and thus the space S is provided between the LCD part 20 and the body part 30, the latch parts 22 and 34 are kept engaged together so that respective extending end parts (i.e., the left end parts in FIG. 3 (a) at which the latch parts 22 and 34 are provided, respectively) of the LCD part 20 and the body part 30 are kept engaged together.

Figure 6:
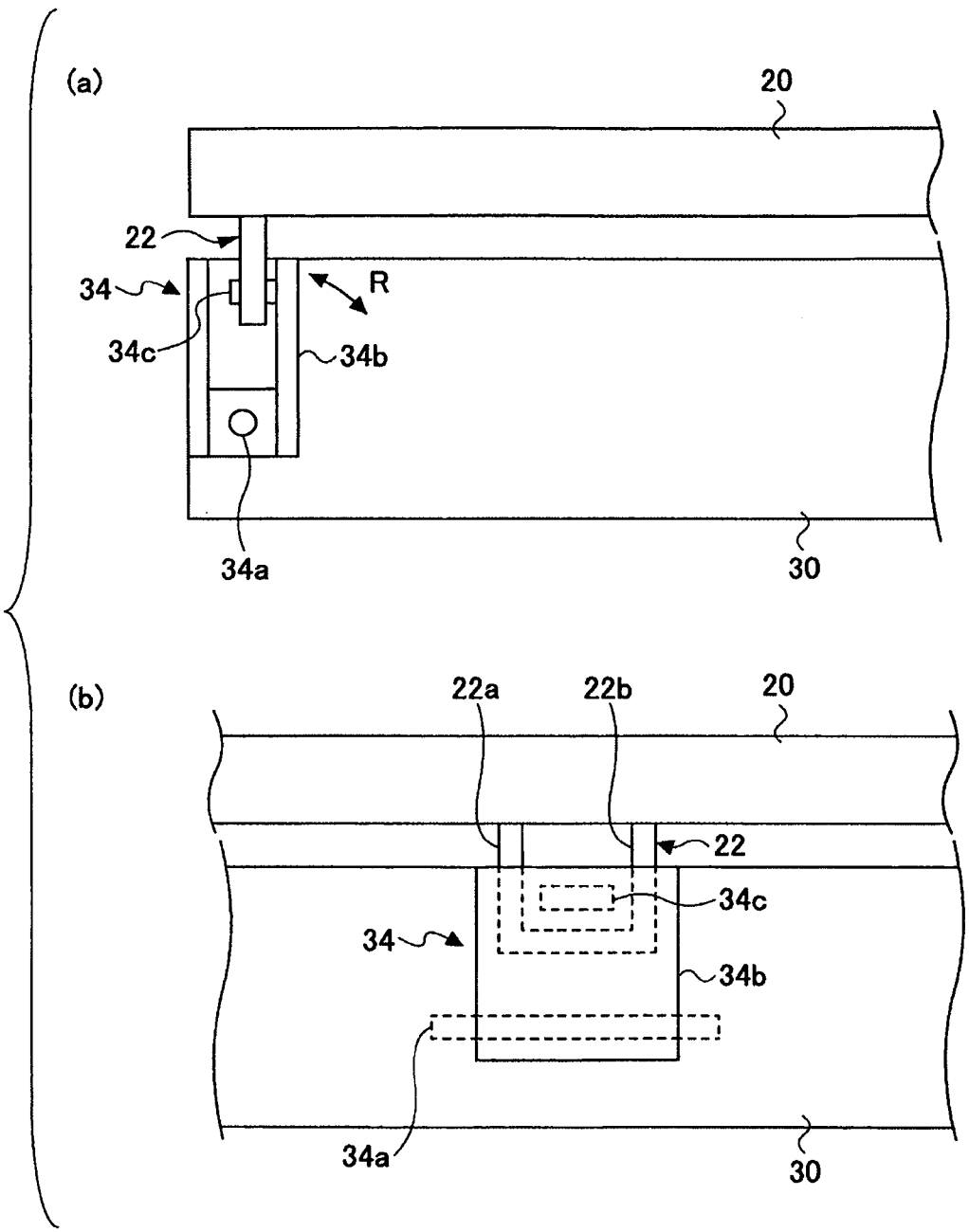
FIG. 6 illustrates one example of a latch structure configured to rotatably lock a body part and an LCD part at their extending end parts.

FIG. 6 shows a specific configuration of the latch parts 22 and 34.

FIG. 6 (a) shows an internal configuration of the latch parts 22 and 34 provided on the respective extending end parts of the body part 30 and the LCD part 20. FIG. 6 (b) shows a front view of the latch parts 22 and 34.

As shown in FIG. 6, the latch part 22 provided to the LCD part 20 is configured by a loop-shaped member 22a having an opening part 22b at the center thereof. On the other hand, the latch part 34 provided to the body part 30 includes a latch part body 34b and a latch pin 34c. The latch part body 34b is configured to rotate in directions indicated by an arrow R shown in FIG. 6 (a) on a rotation shaft 34a.

In the latch parts 22 and 34 shown in FIG. 6, a state shown in FIG. 6 is a state in which the latch parts 22 and 34 are locked together. In this state, the latch pin 34c of the latch part 34 of the body part 30 is inserted into the opening part 22b of the loop-shaped member 22a of the LCD part 20 so that the LCD part 20 is rotatably held by the body part 30 on these engagement parts at which both parts 20 and 30 are engaged with one another. As a result, as shown in FIG. 3, when the hinge part 40 is lifted by the lifting mechanism of the coil spring 35 as shown, the above-mentioned intermediate state (the state shown in FIG. 3) is created.

In order to open the LCD part 20 from the body part 30 to bring the personal computer 10 into the above-mentioned opened state, the latch part body 34b of the latch part 34 of the body part 30 is rotated clockwise in FIG. 6 (a) on the rotation shaft 34a. As a result, the lock pin 34c is removed from the opening part 22b of the loop-shaped member 22a of the latch part 22 of the LCD part 20. As a result, the respective latch parts 22 and 34 of the LCD part 20 and the body part 30 are disengaged from one another, and thereby, the LCD part 20 can be opened from the body part 30 as a result of the LCD part 20 being rotated with respect to the body part 30 on the hinge part 40.

A lifting lock mechanism is provided in the personal computer 10 in the first embodiment of the present invention, and will now be described.

When opening the LCD part 20 from the body part 30, from the above-mentioned intermediate state, the user first presses the hinge part 40 of the LCD part 20 downward against the resilient force of the coil spring 35 (this step is refereed to as a first step for finally opening the LCD part 20 into the above-mentioned opened state (third step, described later)). The lifting lock mechanism is provided such that, thanks to a locking function of the lifting lock mechanism, the LCD part 20 and the body part 30 are placed on one another without space to become approximately parallel to one another, and thus, the above-mentioned closed state is once stably established.

Figure 7:
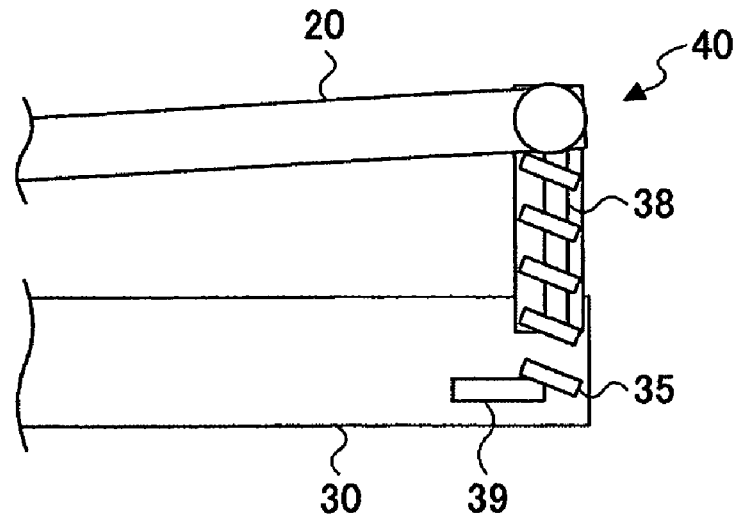
FIGS. 7 and 8 illustrate a lock mechanism in a hinge part.
Figure 8:
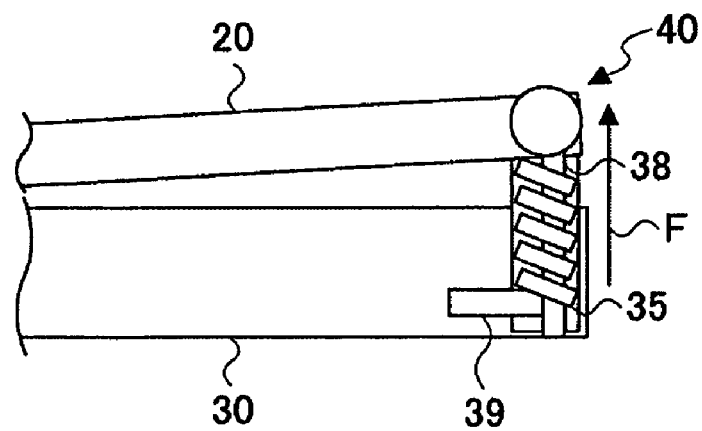

FIGS. 7 and 8 show the lifting lock mechanism.

FIG. 7 corresponds to FIG. 3 (a), and shows a magnified side view of an internal configuration of the hinge part 40 in the above-mentioned intermediate state.

FIG. 8 shows a state in which, from the state of FIG. 7, the LCD part 20 is pressed downward toward the body part 30 against the resilient force F of the coil spring 35 as mentioned above, and thereby, the LCD part 20 and the body part 30 become approximately parallel to one another in the closed state as mentioned above.

As shown in FIGS. 7 and 8, in this example, in the coil spring 35, a movable shaft 38 which is movable vertically in FIGS. 7 and 8 is provided. Further, a lock pin 39 is provided to prevent vertical movement of the movable shaft 38 as a result of the lock pin 39 engaging with a bottom end part of the movable shaft 38 as shown in FIG. 8.

FIG. 8 shows the state in which the lock pin 39 engages with the bottom end part of the movable shaft 38, and thereby, vertical movement of the movable shaft 38 is prevented. On the other hand, a top end part of the movable shaft 38 is fixed to the LCD part 20. As a result, when the upward movement of the movable shaft 38 is thus prevented by the above-mentioned function of the lock pin 39, the LCD part 20 is prevented from lifting against the resilient force F of the coil spring 35 (see FIG. 8). As a result, as mentioned above, the state in which the LCD part 20 is closed to the body part 30 in the closed state is stably maintained. It is noted that, a configuration is provided such that, from this closed state in which the LCD part 20 is prevented from lifting against the resilient force F of the coil spring 35 as mentioned above, the user may disengage the lock pin 39 from the bottom end part of the movable shaft 38 to bring the personal computer 10 into the above-mentioned intermediate state with the function of the lifting mechanism of the coil sparing 35 to lift the hinge part 40 of the LCD part 20.

Then, a further configuration is provided such that, when this closed state is established, i.e., when the state of FIGS. 2 and 8 (i.e., the LCD part 20 and the body part 30 are approximately parallel to one another) is established (the above-mentioned first step), the latch parts 22 and 34 of the LCD part 20 and the body part 30, once engaged and locked together as mentioned above with reference to FIG. 6, is automatically disengaged from one another (second step). This configuration is available as a result of, for example, a link mechanism being provided such that, as a result of the LCD part 20 being pressed downward by the user against the resilient force F of the coil spring 35 as mentioned above to bring the personal computer 10 into the state of FIG. 8 from the state of FIG. 7 (first step), the lock pin 38 automatically engages with the bottom end part of the movable shaft 38, and, in response thereto, the latch part body 34b of the latch part 34 automatically rotates clockwise to disengage the latch parts 22 and 34 from one another (second step).

By thus providing such a configuration, when the hinge part 40 of the LCD part 20 is pressed downward by the user against the resilient force F of the coil spring 35 to bring the personal computer 10 into the closed state first (i.e., the above-mentioned first step), thereby the latch parts 22 and 34 is automatically disengaged from one another (second step), and as a result, the LCD part 20 can be opened from the body part 30 by the user to then finally bring the personal computer 10 into the above-mentioned opened state (i.e., the above-mentioned third step).

It is noted that, when the personal computer 10 is not used, or when the personal computer 10 is carried, it is preferable to bring the personal computer 10 into the above-mentioned closed state, i.e., the state in which, with the locking function of the above-mentioned lifting lock mechanism, the LCD part 20 is pressed downward and is thus placed on the body part 30 in the approximately parallel state together with the body part 30 (i.e., the state of FIG. 8).

In this closed state, the opposite faces of the LCD part 20 and the body part 30 opposite to one another are placed on one another closely so that the above-mentioned space S is not inserted therebetween. As a result, the outline dimensions of the personal computer 10 become minimum, and thus, portability is superior and also, the personal computer 10 may be easily held in a bag or such. It is noted that, a configuration may be provided such that, engagement of the latch part 22 and 34 is available in the closed state even with the above-mentioned configuration of automatically disengaging the latch parts 22 and 34 in response to the hinge part 40 of the LCD part 20 being pressed downward and the lock pin engaging with the bottom part of the movable shaft 38.

Further, in this closed state, since the LCD part 20 and the body part 30 are closely placed on one another and thus the space S is not inserted therebetween, the LCD 21 of the LCD part 20 and the keyboard 31 of the body part 30 are hidden closely in the inner surfaces on which the LCD part 20 and the body part 30 are placed on one another. As a result, in comparison to the above-mentioned intermediate state, adherence of dust/dirt to the LCD 21, the keyboard 31 and so forth, can be effectively avoided, and also, damage thereto can be effectively avoided.

Further, a cable connecting the body part 30 and the LCD part 20 together electrically may preferably be shaped like a coil spring. Thereby, when the LCD part 20 is lifted by the resiliently extending function of the coil spring 35 mounted to the hinge part 40 as mentioned above, also the cable can easily extend accordingly.

Figure 5:
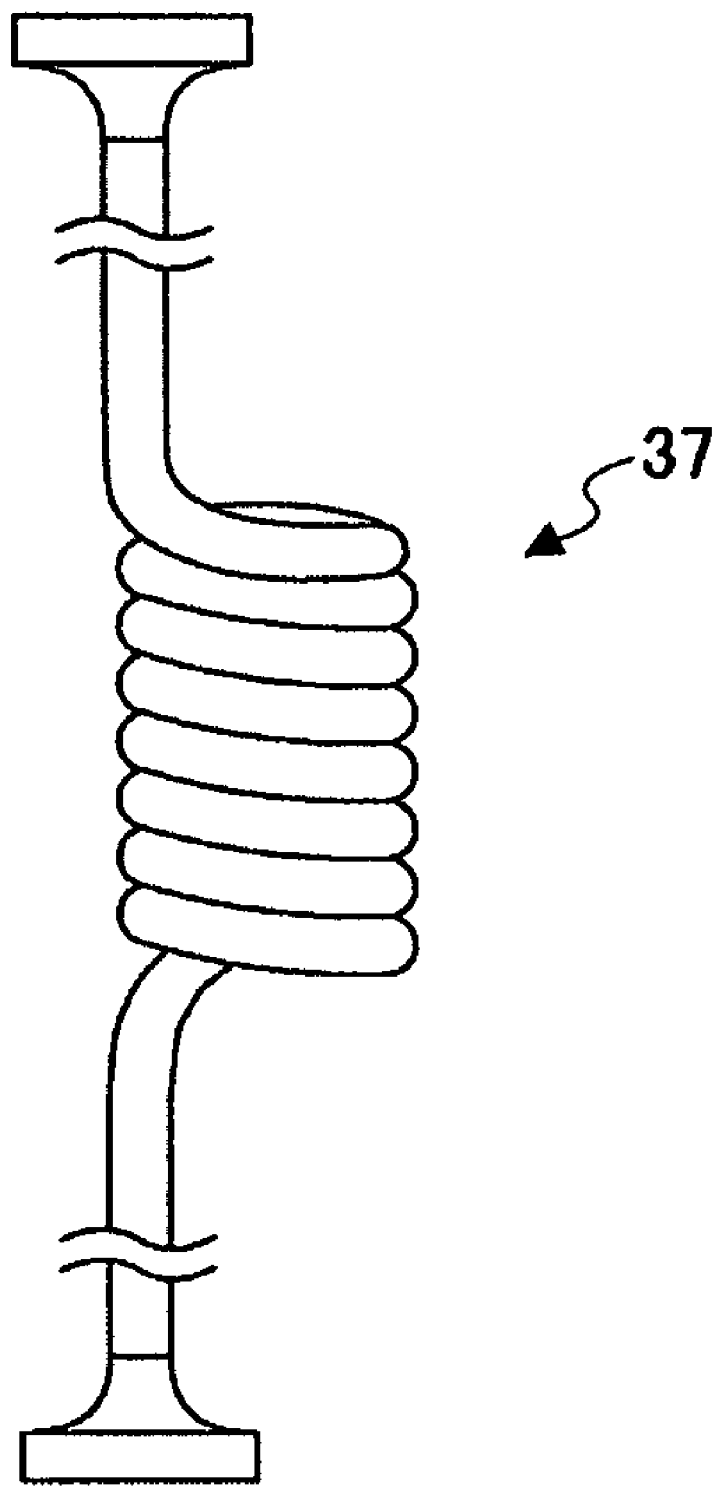
FIG. 5 shows an outline view of a cable shaped like a coil spring.

FIG. 5 shows an outline view of the above-mentioned cable 37 shaped like a coil spring.

As shown in FIG. 5, the cable 37 for electrically connecting the body part 30 and the LCD part 20 together is shaped like a coil spring. As a result, when the LCD part 20 is lifted by the self stretching function of the coil spring 35 (i.e., the above-mentioned intermediate state), the cable 37 can easily extend accordingly. As a result, even when such a configuration is provided that the LCD part 20 is lifted with respect to the body part 30 by the self stretching function of the coil spring 35 mounted to the hinge part 40, the electric connection between the body part 30 and the LCD part 20 can be positively maintained.

Figure 4:
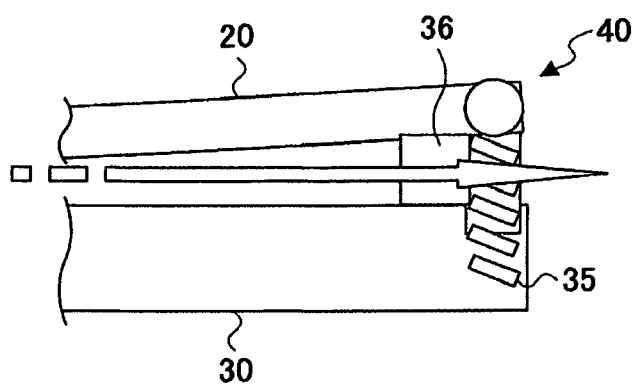
FIG. 4 shows a partial magnified, side view of a personal computer of a clamshell type in a second embodiment of the present invention in the intermediate state.

Next, a personal computer 10 in a second embodiment of the present invention will be described with reference to FIG. 4.

The personal computer 10 in the second embodiment of the present invention is the same as the personal computer 10 in the first embodiment of the present invention described above except for an auxiliary fan 36 and a control circuit thereof. Therefore, duplicate description will be omitted.

In the personal computer 10 in the first embodiment, radiation effect is obtained from natural air circulation as a result of the above-mentioned intermediate state is created in which the space S is inserted between the LCD part 20 and the body part 30 for air circulation. However, when TDP of the controllers such as the CPU or such inside of the personal computer 10 increases, radiation may be insufficient only by the above-mentioned radiation effect of the natural air circulation and the above-mentioned forced radiation effect of the forced radiation fan. In such a case, further measures are required to increase the radiation effect of the personal computer 10 such as to increase the space S between the LCD part 20 and the body part 30, for example.

However, further restriction to the user's operation of the personal computer 10 may be required when the space S between the LCD part 20 and the body part 30 is increased. In this viewpoint, increase in the space S has a limit. Therefore, in the second embodiment of the present invention, the auxiliary fan 36 is provided to improve the forced radiation effect, by means of forced air circulation provided by the auxiliary fan 36.

That is, a configuration is provided such that the auxiliary fan 36 is provided in the space S between the LCD part 20 and the body part 30 in the above-mentioned intermediate state, and a control circuit (not shown) to control the auxiliary fan 36 is provided. As a result, it is possible to effectively reduce the required capacity of the existing CPU radiation fan for example.

For example, a program to control operation of the CPU of the personal computer 10 and a control circuit configuration are provided such that, under the control of the CPU of the personal computer 10, the following operation is carried out automatically: When the user closes the LCD part 20 into the closed state and disengages the lock pin 39 from the movable shaft 38 in the lifting lock mechanism, the self stretching function of the coil spring 35 mounted to the hinge part 40 lifts the LCD part 20, and thus, the above-mentioned intermediate state is established. Then, this fact is detected by the CPU through a sensor. The CPU then starts power supply to the auxiliary fan 36, and thus, the auxiliary fan 36 starts blowing air through the space S between the LCD part 20 and the body part 30.

Further, a configuration is provided such that, when the hinge part 40 is thus lifted by the self stretching function of the coil spring 35, simultaneously the auxiliary fan 36 mounted to the hinge part 40 is lifted to be exposed. Then, the air flowing function of the auxiliary fan 36 causes the forced air circulation in the space S between the LCD part 20 and the body part 30, and as a result, it is possible to obtain radiation effect larger than the radiation effect obtained only from the natural air circulation through the space S between the body part 30 and the LCD part 20 in the intermediate state.

According to design of the related art, a temperature distribution is different between the case where the LCD part 20 is closed (in the closed state) and the case where the LCD part 20 is opened (in the opened state). Therefore, different radiation designs may be required based on different conditions between the case where the LCD part 20 is closed (in the closed state) and the case where the LCD part 20 is opened (in the opened state). For example, design for arranging temperature sensors for controlling driving of the forced radiation fan may have to be made separately for each of these different conditions in the related art.

In contrast thereto, in the above-mentioned respective embodiments of the present invention, in the intermediate state which is close to the closed state, the space S is provided between the LCD part 20 and the body part 30. As a result, a heat distribution in the opened state can also be applied to the intermediate state (instead of the closed state) in common in radiation design. Therefore, it is possible to carry out optimization based on the common heat distribution for the number and an arrangement of temperature sensors provided inside of the personal computer 10, for each of the opened state and the intermediate state. Further, it is also possible to select optimum arrangement and optimum capability of the forced radiation fan(s) based on the common conditions, for each of the opened state and the intermediate state.

While the invention herein disclosed has been described by means of specific embodiments and applications thereof, numerous modifications and variations could be made thereto by those skilled in the art without departing from the scope of the invention set forth in the claims.

What is claimed is:

1. An electronic apparatus comprising: a first part having a first end and a second end opposite to the first end; a second part having a first end and a second end opposite to the first end; a rotating holding part configured to rotatably hold the second part and the first part to one another at the second end of the second part and at the second end of the first part; a latch part configured to cause the second part and the first part to engage with one another at the first end of the second part and at the first end of the first part; and a lifting mechanism located in the electronic apparatus and configured to cause the second end of the second part to be apart from the second end of the first part, wherein: the lifting mechanism causes the second end of the second part to be apart from the second end of the first part while the latch part causes the second part and the first part to engage with one another at the first end of the second part and at the first end of the first part.

2. The electronic apparatus as claimed in claim 1, wherein: the lifting mechanism comprises a coil spring.

3. The electronic apparatus as claimed in claim 2, further comprising:
   a cable electrically connecting the first part and the second part, wherein:
   the cable is shaped as a coil spring, and configured so that, when the second part is lifted from the first part by a function of the lifting mechanism, the cable extends accordingly.

4. The electronic apparatus as claimed in claim 1, further comprising:
   a supplementary circulating device configured to increase radiation effect of a space provided between the second part and the first part in a state in which the lifting mechanism causes the second end of the second part to be apart from the second end of the first part and the latch part causes the second part and the first part to engage with one another at the first end of the second part and at the first end of the first part, wherein:
   the supplementary circulating device is provided to the rotating holding part, and, when the second part is lifted from the first part by a function of the lifting mechanism, the supplementary circulating device is lifted to cause supplementary circulation in the space provided between the first part and the second part.

5. The electronic apparatus as claimed in claim 1, wherein: the first part has a processing unit and an operation part for operating the electronic apparatus, and
   the second part has a display screen.

6. The electronic apparatus as claimed in claim 5, wherein: the electronic apparatus is a personal computer.

* * * * *